US005201494A

United States Patent [19]

Lundman

[11] Patent Number: 5,201,494

[45] Date of Patent: Apr. 13, 1993

[54] HYDRAULIC JACK AND PUMP USABLE THEREWITH

[76] Inventor: Philip L. Lundman, 3631 Fredonia-Kohler Dr., Fredonia, Wis. 53021

[21] Appl. No.: 951,942

[22] Filed: Sep. 24, 1992

Related U.S. Application Data

[63] Continuation of Ser. No. 765,952, Sep. 26, 1991, abandoned.

[51] Int. Cl.[5] ..... B60P 1/48

[52] U.S. Cl. ..... 254/8 B

[58] Field of Search ..... 254/1, 8 B, 8 R, 2 B, 254/2 R, 93 H, 93 R, 124; 60/52 HA, 97 H, 472; 92/108; 91/412

[56] References Cited

U.S. PATENT DOCUMENTS

| | | | |
|---|---|---|---|
| 3,091,836 | 5/1963 | Arnes et al. . | |
| 3,181,836 | 5/1965 | Arnes et al. . | |
| 3,197,179 | 7/1965 | Arnes et al. . | |
| 3,258,921 | 7/1966 | Prescott . | |
| 3,404,868 | 10/1968 | Belongia et al. . | |
| 3,410,087 | 11/1968 | Arnes et al. . | |
| 3,412,980 | 11/1968 | Pikoske . | |
| 3,449,910 | 6/1969 | Reynolds | 254/93 R |
| 3,782,689 | 1/1974 | Barosko | 254/93 R |
| 4,522,548 | 6/1985 | Oswald et al. | 254/8 C |
| 4,641,815 | 2/1987 | Yu | 254/93 H |
| 4,765,593 | 8/1988 | Hung | 254/8 B |

*Primary Examiner*—Robert C. Watson

*Attorney, Agent, or Firm*—Michael, Best & Friedrich

[57] ABSTRACT

A hydraulic jack includes a linkage movable from a first position to a second position for engaging and elevating a load, a hydraulic ram coupled to the linkage for moving the same toward its second position upon the application of fluid pressure, and a pump coupled to the hydraulic ram for applying fluid pressure thereto. The pump includes a piston operable for delivering a first quantity of hydraulic fluid to the ram through a first path at a first pressure and a second quantity of hydraulic fluid to the ram through a second path at a second pressure, the first quantity being substantially larger than the second quantity and the first pressure being substantially lower than the second pressure. A pressure relief valve is coupled to the first path for venting the same when the back pressure from the hydraulic ram exceeds a predetermined value whereby the linkage is advanced at a first, higher speed from its first position to engagement with the load and at a second, lower speed but with increased force after the load has been engaged for elevating the same.

5 Claims, 2 Drawing Sheets

HYDRAULIC JACK AND PUMP USABLE THEREWITH

CROSS REFERENCE TO RELATED APPLICATION

This is a continuation of U.S. patent application Ser. No. 07/765,952, filed Sep. 26, 1991 now abandoned.

BACKGROUND OF THE INVENTION

This invention relates to hydraulic jacks and more particularly to a new and improved hydraulic pumping system for jacks and the like.

Hydraulic jacks commonly include a hydraulic ram mechanically coupled to a linkage and a pump operable to deliver hydraulic fluid under pressure to the ram for elevating the linkage. In one type of jack, the pump is manually operable by means of a handle and has a constant displacement for delivering the same quantity of hydraulic liquid to the ram for each handle stroke. This is true both when the linkage is being elevated toward engagement with the load to be lifted and while the lifting operation is in progress. Because of the force normally required to elevate the load is great, hydraulic fluid is delivered at high pressure and low volume. As a result, the linkage is elevated at a relatively slow rate both prior to and after the load is engaged.

SUMMARY OF THE INVENTION

It is an object of the invention to provide a new and improved hydraulic jack.

Another object of the invention is to provide a new and improved hydraulic pumping system for hydraulic jacks.

A further object of the invention is to provide a hydraulic jack which advances at a higher rate when unloaded than when under load.

Yet another object of the invention is to provide a hydraulic jack having a first higher elevating speed when unloaded and a second lower elevating speed when under load.

A still further object of the invention is to provide a new and improved pump.

These and other objects and advantages of the invention will become more apparent from the detailed description thereof taken with the accompanying drawings.

According to the preferred embodiment, the invention comprises a hydraulic jack including a hydraulic ram for elevating a load upon the application of fluid pressure and pump means coupled to the hydraulic ram for applying fluid pressure thereto and including first piston means for delivering a first quantity of hydraulic fluid to the ram through a first path at a first pressure and a second piston means for delivering a second quantity of hydraulic fluid to the ram through a second path at a second pressure wherein the first quantity of hydraulic fluid is substantially larger than the second quantity and the first pressure is substantially lower than the second pressure. The jack also includes operating means for activating the piston means and pressure relief means coupled to the first path for venting the same when the back pressure from the hydraulic ram exceeds a predetermined value whereby the linkage is advanced at a first, higher speed from an initial position to engagement with the load and at a second, lower speed and with increased force after the load has been engaged for elevating the same.

DETAILED DESCRIPTION OF THE PREFERRED EMBODIMENT

Figure 1:
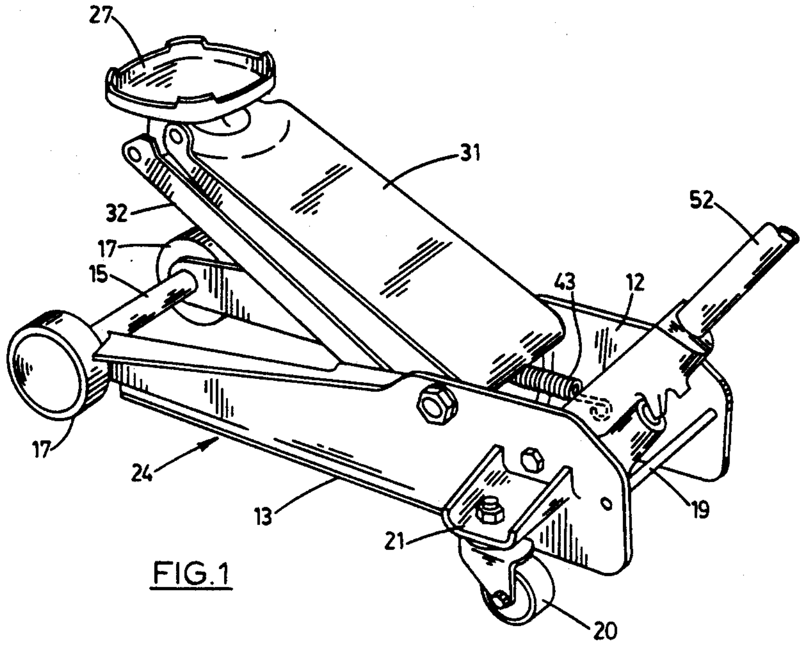
FIG. 1 is a perspective view illustrating a jack incorporating the present invention.
Figure 2:
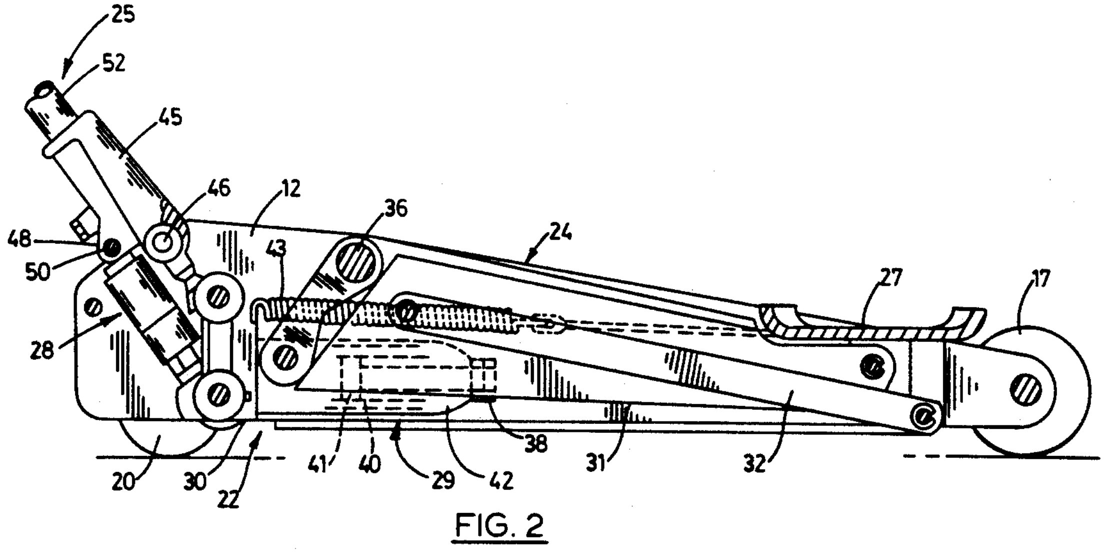
FIG. 2 is a side elevational view of the jack illustrated in FIG. 1.

FIGS. 1 and 2 show an example of a hydraulic jack 10 in which the hydraulic system according to the invention may be employed. Those skilled in the art will appreciate that the illustrated jack is intended as an example only and that the hydraulic system according to the invention may be employed in other types of jacks as well.

The jack 10 includes a frame consisting of a pair of side plates 12 and 13. At their front ends, the plates 12 and 13 are joined in a parallel, spaced apart relation by a tubular member 15 that also houses an axle for a pair of front wheels 17. The opposite ends of the side plates 12 and 13 are suitably joined by a cross brace 19 and are supported by a pair of casters 20 mounted on brackets 21, one of which extends laterally from each of the side plates.

Mounted between the plates 12 and 13 is a hydraulic assembly 22 and a linkage assembly 24. The hydraulic assembly 22 is operated by a handle mechanism 25 for moving the linkage assembly 24 from its retracted position shown in FIG. 2 to the advanced position shown in FIG. 1. Extension of the linkage assembly 24 carries a lift cap 27 into engagement with the load to be elevated.

The hydraulic assembly 22 includes a pump assembly 28, a hydraulic ram assembly 29 and a valve block assembly 30 for interconnecting the pump assembly 28 to the ram assembly 29. The linkage assembly 24 includes a bell crank 31 and a pair of links 32. The bell crank 31 is pivotally mounted on a fulcrum pin 36 extending between side plates 12 and 13. The links 32 may be pivotally mounted at one end on one of the side plates 12 or 13 and at their other ends to the free end of the bell crank 31 and below the lift cap 27.

While any conventional hydraulic ram may be employed, in the illustrated embodiment, the ram 29 includes a plunger 38 which engages the bell crank 31 below the fulcrum pin 36 so that movement of the plunger 38 outwardly from ram 39 will pivot the bell crank 31 counterclockwise as viewed in FIG. 2. The ram assembly 29 also includes a cylinder 40 and a piston 41 movable therein and coupled to the plunger 38. Surrounding the cylinder 40 is a housing 42 which acts as a reservoir or sump. A pair of springs 43 extend between the valve block 30 and the bell crank 31 for biasing the same toward its unpivoted position shown in FIG. 2.

The handle assembly 25 includes a socket 45 pivotally mounted by a pin 46 extending between the side plates 12 and 13 and having a finger 48 which carries a roller 50 for engaging the pump assembly 28 as will be described more fully below. The socket 45 also includes a recess for receiving a handle 52 to facilitate operation.

Figure 3:
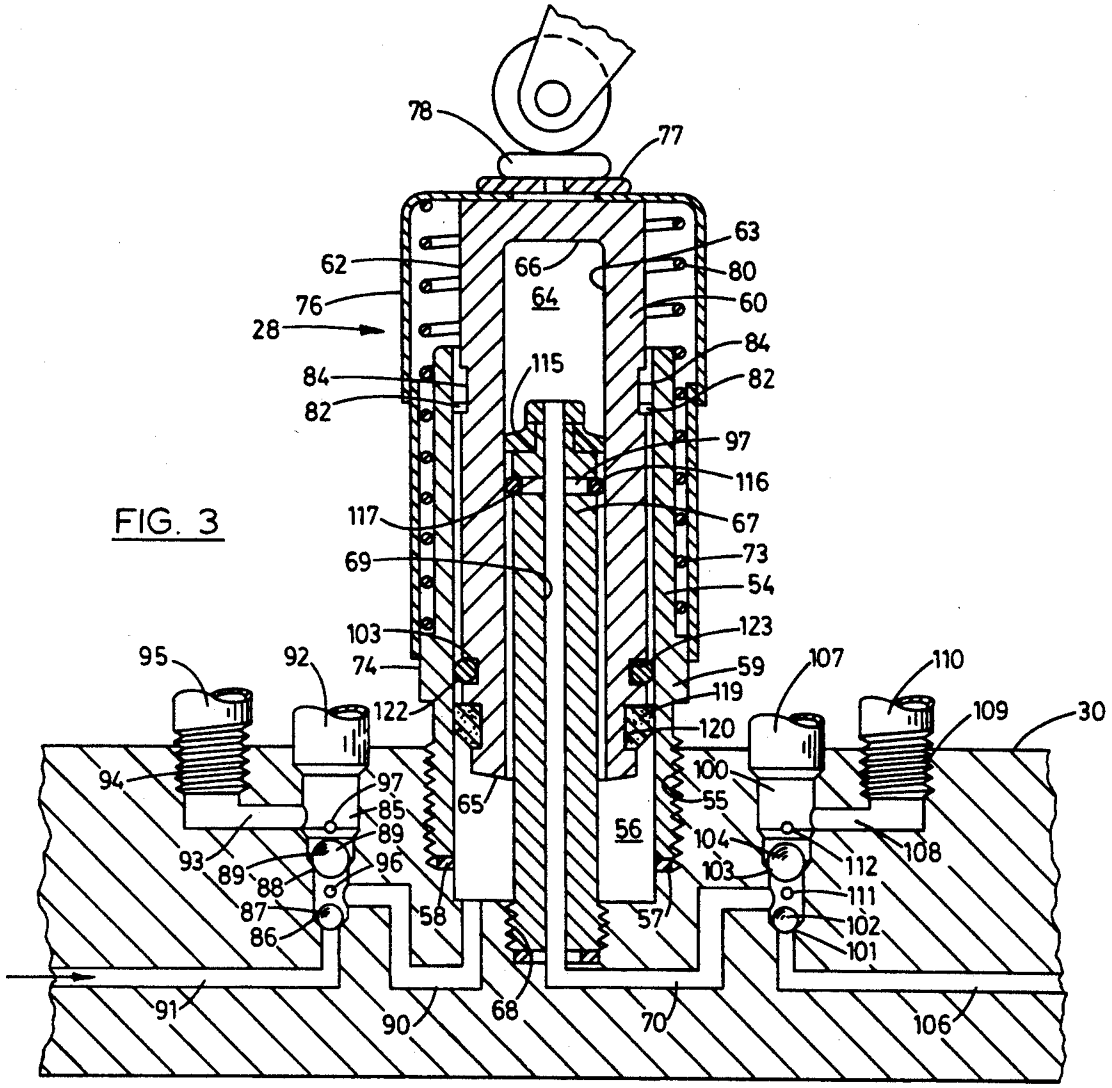
FIG. 3 schematically illustrates a pump usable with the jack of FIG. 1.

The pump assembly 28 is shown in FIG. 3 to include a hollow, generally tubular body 54 having external threads at its lower end for being received in an internally threaded bore 55 in the valve block 30. An O-ring seal 57 is provided between the lower end of the body 54 and a shoulder 58 formed adjacent the lower end of bore 55. The body 54 extends upwardly from its threaded lower end in surrounding relation to a movable piston 60 having an outer cylindrical surface 62 and an inner cylindrical bore 63 which defines a cylindrical cavity 64. The movable piston 60 has a first work surface 65 which is annular and defined by the lower end of piston 60 and a second work surface 66 which is circular and defined by the upper surface of the cavity 64.

A fixed piston 67 is disposed within the bore 63 and in a coaxial relation therewith. Piston 67 is externally threaded at its lower end for being received within an internally threaded counter bore 68 formed coaxially within hole 55. An axial bore 69 is formed in stationary piston 67 and its upper end opens into the cavity 64 and its lower end communicates with a passage 70 formed in valve block 30. It can be seen in FIG. 3 that the piston 60 is reciprocably mounted between the body 54 and the fixed piston 67.

A sleeve 73 is fixed to and extends coaxially from an increased diameter section 74 of the body 54 and in a spaced apart, coaxial relation. A second sleeve 76 having an inverted cup shape is fixed by means of a retaining ring 77 to a projection 78 extending from the upper end of piston 60 and through sleeve 76. The lower edge of sleeve 76 telescopes over the upper edge of the fixed sleeve 73 and is slidable relative thereto. A return spring 80 is disposed in surrounding relation to the body 54 and the piston 60 and its upper end engages the undersurface of the sleeve 76 and its lower end engages the larger diameter section 74. It can be seen that the piston 60 and the upper sleeve 76 are reciprocally mounted relative to the housing 54 and the fixed sleeve 73 and that the spring 80 biases the piston 60 outwardly relative to the housing 54. Relative movement of piston 60 with respect to the housing 54 is limited by a pair of fingers 82 integrally formed on the inner surface of housing 54 and adjacent its upper end and projecting inwardly into grooves 84 formed in the outer surface of piston 60 and on diametrically opposite sides thereof.

A bore 85 is formed in valve block 30 and defines a first seat 86 adjacent its lower end for a first ball valve 87 and a second seat 88 intermediate its ends for a second ball valve 89. A passage 90 connects the cavity 56 to the bore 85 and between the ball valves 87 and 89. A second passage 91 connects the lower end of bore 85 and below ball valve 87 to sump housing 42. The upper end of bore 85 is connected by conduit 92 to the cylinder 40. A third passage 93 connects bore 85 above ball valve 89 to a second bore 94 whose upper end contains a low pressure relief valve 95. Movement of the ball valves 87 and 89 away from their respective seats 86 and 88 is limited in any suitable manner, such as by pins 96 and 97, respectively.

A second bore 100 is also formed in valve block 30 and defines a first seat 101 adjacent its lower end for a first ball valve 102 and a second seat 103 intermediate its ends for a second ball valve 104. The passage 70 connects the cavity 64 to the bore 100 and between the ball valves 102 and 104. A second passage 106 connects the lower end of bore 100 and below ball valve 102 to sump housing 42. The upper end of bore 100 is connected by conduit 107 to the cylinder 40. A third passage 108 connects bore 100 above ball valve 104 to a second bore 109 whose upper end contains a high pressure relief valve 110. Movement of the ball valves 102 and 104 away from their respective seats 101 and 103 is limited in any suitable manner, such as by pins 111 and 112, respectively.

The space between the movable piston 60 and the fixed piston 67 may be sealed by a packing 115 fixed to the upper end of fixed piston 67 and engaging the inner surface 63 of movable piston 60. In addition, there is an O-ring 116 engaging the surface 63 and disposed in an annular groove 117 below the packing 94 and surrounding the fixed piston 67. Similarly, an annular packing 119 is disposed in a groove 120 surrounding the lower end of movable piston 60 and engaging the inner surface of housing 54 and seals the gap between fixed piston 67 and housing 54. In addition, there is an O-ring 122 disposed in an annular groove 123 surrounding piston 60 above the packing 119 and engaging the inner surface of housing 54.

In operation, the jack 10 is be positioned such that the lifting cap 27 is located below that portion of the vehicle or other object to be lifted. The handle 52 is inserted in socket 45 and oscillated downwardly and upwardly, thereby forcing the roller 50 against the piston extension 78. This forces the movable piston 60 downwardly relative to the housing 54 and the fixed piston 67. Such downward movement will force a first quantity of hydraulic fluid from the cavity 56 through passage 90, past ball valve 89 and to the cylinder 40 and a second quantity of hydraulic fluid from the cavity 64 through passage 70, past ball valve 104 and to the cylinder 40. Ball valves 87 and 102 will seat to prevent flow to sump housing 42. When the handle 52 is reciprocated upwardly, allowing the piston 60 to be elevated by the return spring 80, fluid will be drawn into cavity 56 from the sump through ball valve 87 and into the cavity 64 from the sump through ball valve 102. The dimensions of the components of pump 28 are such that the work surface 65 of the movable piston 60 exceeds that of the work surface 66 so that each time the piston 60 moves downwardly, a relatively large volume of fluid at a low pressure is be delivered from cavity 56 and a relatively low volume of fluid at high pressure is delivered from cavity 64. This high-volume, low-pressure fluid from cavity 56 permits the ram 38 to move at a relatively higher speed than comparable single piston pumps which normally deliver a low volume of liquid at high pressure for elevating the load.

When the lift cap 27 engages the load to be lifted, the back pressure exerted by the load will exceed the capacity of the overload valve 95 so that each time the piston 60 descends, the valve 95 opens thereby bypassing the fluid delivered from cavity 56 to the sump. However, the low-volume, high-pressure liquid from cavity 64 continues to be delivered to the cylinder 42 each time the piston 60 is moved downwardly. This will then elevate the load at the normal speed. If the back pressure exerted by the load exceeds the lifting capacity of the jack 10, high-pressure overload valve 110 will operate, thereby bypassing the liquid delivered from cavity 64 to the sump.

In this manner, the lift cap 27 may be elevated rapidly into engagement with the load by the delivery of high-volume, low-pressure fluid to the cylinder 40 and thereafter, the load can be elevated at the normal rate by the delivery of high-pressure, low-volume liquid. When it is desired to lower the load, a release valve 116 may be operated in the manner well-known in the art.

Figure 4:
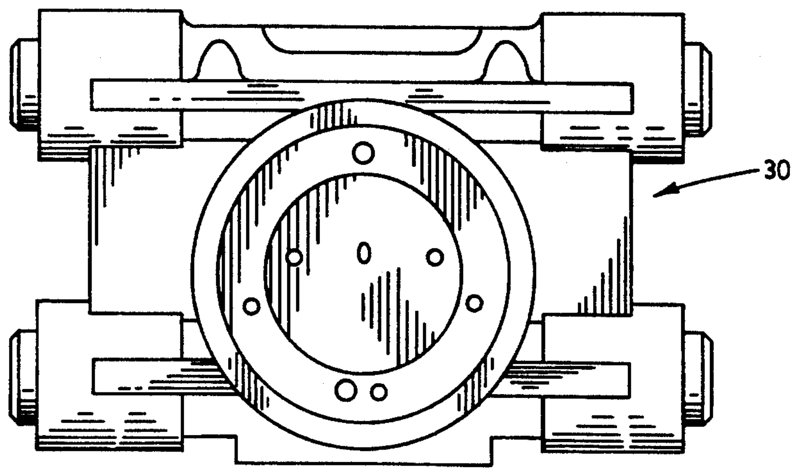
FIG. 4 is a front view of the pump and valve block housing of the jack illustrated in FIG. 1.

It will be appreciated that valve block 30 is schematically illustrated in FIG. 3. For a truer representation of valve block 30, reference is made to FIG. 4.

While only a single embodiment of the invention has been illustrated and described, it is not intended to be limited thereby, but only by the scope of the appended claims.

I claim:

1. A hydraulic jack comprising linkage means movable from a first position to a second position for engaging and elevating a load, a hydraulic ram coupled to said linkage means for moving the same toward its second position upon the application of fluid pressure, said hydraulic ram including a cylinder and a piston reciprocal relative to said cylinder, said hydraulic jack further including pump means coupled to said hydraulic ram for applying fluid pressure thereto, said pump means including a tubular body having an inner surface, said pump means further including piston means operable for delivering a first quantity of hydraulic fluid to said ram through a first path at a first pressure and a second quantity of hydraulic fluid to said ram through a second path at a second pressure, said first quantity being substantially larger than said second quantity and said first pressure being substantially lower than said second pressure, said piston means including a cylindrical movable piston reciprocal in said tubular body and having a central cylindrical axially extending bore defining an inner cylindrical surface, having an open end defining a first work surface, and having a closed end including an inner surface adjacent said bore defining a second work surface, said piston means including a fixed piston disposed axially within said bore and having an outer surface, said movable piston being movable relative to said tubular body and over said fixed piston, a first cavity being defined by said inner surface of said tubular body, by said outer surface of said fixed piston, and by said first work surface, and a second cavity being defined by said inner cylindrical surface of said movable piston, by said second work surface and by the outer surface of said fixed piston, said first cavity being in fluid communication with said first path and said second cavity being in fluid communication with said second path, and said pump means including pressure relief means coupled to said first path means for venting the same when the back pressure from said hydraulic ram exceeds a predetermined value whereby said linkage is advanced at a first, higher speed from its first position to engagement with said load and at a second, lower speed but with increased force after said load has been engaged for elevating the same.

2. The hydraulic jack set forth in claim 1 wherein said first work surface is larger than said second work surface.

3. The hydraulic jack set forth in claim 1 wherein said first cavity is separated from said second cavity when said linkage means is in its first position and when said linkage means is in its second position.

4. A hydraulic jack including hydraulic ram means operable to elevating upon the application of fluid pressure, and pump means coupled to said hydraulic ram for applying fluid pressure thereto, said pump means including a valve block, pressure means operable for delivering a first quantity of hydraulic fluid to said ram through a first path at a first pressure and a second quantity of hydraulic fluid to said ram through a second path at a second pressure, said pressure means including a fixed piston supported by said valve block and a movable piston reciprocal relative to said fixed piston, said first quantity being substantially larger than said second quantity and said first pressure being substantially lower than said second pressure, operating means for operating said pressure means, and pressure relief means coupled to said first path, and including a ball valve in said valve block for venting the same when the back pressure from said hydraulic ram exceeds a predetermined value whereby said ram means is advanced at a first, higher speed when unloaded and at a second, lower speed but with increased force when loaded.

5. A hydraulic jack including hydraulic ram means operable to elevating upon the application of fluid pressure, and pump means coupled to said hydraulic ram for applying fluid pressure thereto, said pump means including a fixed piston and a movable piston reciprocal relative to said fixed piston between first and second positions, said pump means further including pressure means operable for delivering a first quantity of hydraulic fluid to said ram through a first path at a first pressure and a second quantity of hydraulic fluid to said ram through a second path at a second pressure, said first quantity being substantially larger than said second quantity and said first pressure being substantially lower than said second pressure, pressure relief means coupled to said first path for venting the same when the back pressure from said hydraulic ram exceeds a predetermined value, said pump means further including means defining a first cavity coupled to said first path, and means defining a second cavity coupled to said second path, said movable piston including a first work surface communicating with said first cavity and a second work surface communicating with said second cavity, said first cavity being separated from said second cavity when said movable piston is in its first position and when said movable piston is in its second position, whereby said ram means is advanced at a first, higher speed when unloaded and at a second, lower speed but with increased force when loaded.

* * * * *